United States Patent Office 3,826,714
Patented July 30, 1974

3,826,714
THERMOPHILIC GLUCOSE ISOMERASE ENZYME PREPARATION
Mikio Suekane, Saitama, and Mutsuo Kanno and Shiro Hasegawa, Tokyo, Japan, assignors to CPC International Inc.
No Drawing. Filed Oct. 26, 1971, Ser. No. 192,313
Int. Cl. C12b 1/00
U.S. Cl. 195—31 F                    16 Claims

ABSTRACT OF THE DISCLOSURE

Describes a new glucose isomerase enzyme preparation characterized by thermal stability and high optimum temperature of enzyme activity.

FIELD OF THE INVENTION

This invention relates to an enzymatic isomerization process. More particularly, the invention relates to the isomerization of glucose to produce fructose-bearing products, by enzymatic isomerization utilizing novel enzyme preparations. The invention also relates to a process for producing novel, thermally stable glucose isomerase enzyme preparations.

When the isomerization of glucose to fructose is conducted with the production and recovery of a fructose-bearing solution in which the fructose concentration is at a significant level, such as for example, from about 1% by weight to about 40% by weight or more, dry substance basis, the sweetness of the product is enhanced. This increases its economic value for many applications.

In recent years, and particularly since the issuance of the pioneer patent in this field, U.S. 2,950,228, granted to Richard O. Marshall on Aug. 23, 1960, there has been a great amount of activity in connection with enzymatic isomerization. Several different microbial sources of glucose isomerase enzyme preparations have been identified. In some cases, the enzyme which isomerizes glucose to fructose has been termed xylose isomerase, as for example in the Marshall patent. The reason for this nomenclature is that the enzyme preparations isomerize xylose to xylulose, in addition to exhibiting isomerizing activity toward glucose.

Glucose isomerase is known to be produced from several different genera of microorganisms. However, the microorganisms have generally been of the mesophilic variety, which propagate at optimum growth temperatures in the range from about 18° C. to as high as 45° C., but most commonly in the range from 18° C. to 25° C., to produce enzyme preparations that are effective at and stable at correspondingly low temperatures.

DESCRIPTION OF THE PRIOR ART

The enzymatic isomerization of glucose to fructose can be substantially improved by conducting the isomerization at temperatures above 50° C., and even more advantageously, at temperatures above 60° C. Such higher temperatures increase the isomerization rate and inhibit the growth of undesirable microorganisms. Prior art enzymatic isomerization processes often have not permitted the use of such high temperatures.

The use of a microorganism of the *Actinomycetales* order, for the production of a glucose isomerizing enzyme, was reported by Sato and Tsumura in their paper, *A Study on Isomerization of Dextrose by a Streptomyces Strain,* at the Annual Meeting of the Agricultural Chemical Society of Japan held at Sapporo in July 1964.

A great deal of subsequent work, relating to the use of microorganisms of the *Streptomyces* genus, for enzymatic production, has been conducted at the Fermentation Research Institute of Japan, as reported by Dr. Y. Takasaki and his associates. Some of this work has been summarized in the publication, *Fermentation Advances,* Academic Press, New York, 1969, in the article by Dr. Takasaki et al. beginning at page 561.

The work of Sato and Tsumura led to the use of *Streptomyces* microorganisms for the production of isomerizing enzymes by the use of a nutrient medium containing xylose. Unfortunately, if xylose is required for enzyme production, there are limitations on the nature and cost of the medium that is required.

Dr. Takasaki and his associates identified certain strains of *Streptomyces* that secreted xylanase, and that therefore could be cultured in nutrient media containing xylan, which is much less expensive than xylose. The enzyme preparations obtained from these strains represented an advance in the art. At least one of them is reported to lose no significant activity when exposed to a temperature as high as 70° C. Unfortunately, the economics and other limitations on the nature and cost of the culture media required even for these microorganisms impose severe limitations on the process.

In a paper appearing in the periodical, Agricultural and Biological Chemistry, Volume 30, No. 10, pages 1015 through 1023, in 1966, entitled *Studies on D-Glucose Isomerizing Activity of D-Xylose Grown Cells from Bacillus Coagulans, Strain HN–68,* Yoshimura, Danno and Natake described the production of a glucose isomerase enzyme preparation from a strain of *Bacillus coagulans* that exhibited growth in the temperature range from 27° C. to 35° C., and that was said to be characterized by an optimum temperature of from 45° C. to 50° C. The maximum temperature was reported to be 65° C.

Yoshimura et al. reported that they used a suspension of whole cells, in the presence of a cobalt salt and toluene, to effect isomerization of a glucose solution at 50° C. This was a most interesting result as to the temperature level at which the isomerization was conducted, but the attention of the authors was addressed primarily toward identifying the conditions necessary for maximum production of enzyme activity by the microorganism, and to techniques for optimizing the effectiveness of their enzyme preparations.

OBJECTS OF THE INVENTION

One object of the present invention is to provide an improved, more thermally stable glucose isomerase enzyme preparation, and a practical process for producing it.

Another object of the invention is to provide an improved, practical process for the production of glucose isomerase enzyme preparations, requiring reduced culturing time for the microorganism.

A related object of the invention is to provide an improved high temperature process for the isomerization of glucose to fructose.

A further object of the invention is to provide an improved, practical process for the isomerization of glucose to fructose, at higher temperatures that are now feasible with the attendant advantages thereto.

Still another object of the invention is to provide improved fructose-bearing isomerizates of glucose.

Other objects of the invention will be apparent hereinafter from the specification and from the recitals of the appended claims.

DEFINITIONS

Because of the plethora of terms that are in common use in the art, a few definitions are made to simplify the present application and permit it to be more concise.

Starch hydrolyzate.—The term "starch hydrolyzate" is used in a general way to refer to a syrup or dry product that is made by the hydrolysis of starch. Such a product may be made by acid or enzymatic hydrolysis, or by a combination of acid and enzymatic hydrolysis. A preferred type of starch hydrolyzate for use for isomerization in accordance with the present invention is produced by acid thinning to a D.E. of 10 or less, followed by enzymatic saccharification to a D.E. above 95, and preferably above 97.5.

Glucose and dextrose.—The monosaccharide in a starch hydrolyzate is commonly referred to in the art as "glucose," whether the starch hydrolyzate is in the form of a syrup or in the form of solids. The term "dextrose" is commonly reserved for the refined crystalline monosaccharide that is recovered from a high D.E. starch. As used in this application, the term "glucose" will be used to embrace this monosaccharide in any form, in solution or dry, in the form of a starch hydrolysate syrup, syrup solids, or in refined crystalline form.

Fructose and levulose.—The terms "fructose" and "levulose" are generally employed interchangeably in the art to refer to the isomer of glucose that is sweeter than glucose. This isomer is found in honey and in invert sugar, along with glucose, and it is valuable because of its sweetness. The term "fructose" will be used to refer to this monosaccharide.

The enzyme.—The enzyme that isomerizes glucose to fructose has been referred to in the art by several names. It is referred to in the Marshall patent, 2,950,228, as xylose isomerase, because it isomerizes xylose to xylulose. This activity is in addition to its ability to isomerize glucose to fructose. It has also been referred to in the art as dextrose isomerase and glucose isomerase. The term "glucose isomerase" will be used herein.

Enzyme preparation.—The term "enzyme preparation" is used to refer to any composition of matter that exhibits the desired glucose isomerase enzyme activity. The term is used to refer, for example, to live whole cells, dried cells, cell extracts, and refined and concentrated preparations derived from the cells.

BRIEF SUMMARY OF THE INVENTION

We have now discovered that it is possible to produce a glucose isomerase enzyme preparation of enhanced thermal stability, by the culture of a thermophilic microorganism that has an optimum growth temperature above 55° C., utilizing xylose or a source of xylose as the inducing agent and as at least a part of the carbon source in the culture medium. Suitable thermophilic microorganisms generally have the characteristics, we have found, of *Bacillus stearothermophilus*.

In an induced glucose isomerase enzyme preparation, prepared in accordance with one preferred embodiment of the invention, retains a substantial portion of its enzymatic activity after exposure to a temperature of about 80° C. for 30 minutes.

We have also discovered an advantageous method of isomerizing glucose by subjecting a solution of the glucose to the action of the induced glucose isomerase of a thermophilic microorganism that has an optimum growth temperature above 55° C.

To produce fructose-bearing products, we prefer to subject a glucose solution to the action of an enzyme preparation obtained by growing a strain of *Bacillus stearothermophilus* in a culture medium containing, as an inducing agent and as at least a part of the carbon source, xylose or a xylose-supplying material. Preferably, the isomerization is conducted at a temperature of at least 45° C., with the glucose concentration in the range from 0.5 to 5 molar, during a period from 1 to 72 hours.

DETAILED DESCRIPTION OF THE INVENTION

Culture of the Microorganism (A) Isolation of the preferred strains of thermophilic microorganisms.—Several strains of spore-forming thermophilic bacilli, that produce thermally stable glucose isomerase, were isolated from different soil samples in the following way.

About 1 gram of each soil sample was suspended in 5 ml. of sterilized 0.85% NaCl solution, and 1 ml. of the suspension was then poured into a 90 mm. petri dish containing 20 ml. of a xylose-starch agar medium containing 0.5% of xylose, 0.5% of soluble starch, 0.5% of peptone, 1% of corn steep liquor (wet basis), 0.5% of meat extract, 0.25% of yeast extract, 0.5% of NaCl, 0.05% of $MgSO_4 \cdot 7H_2O$, 0.024% of $CoCl_2 \cdot 6H_2O$, and 2% of agar, the pH value of which was adjusted to 7.0. The petri dish was incubated at 60° C. for a few days. After incubation, colonies of organisms were picked up on xylose-starch agar slants.

Each of the strains was identified as falling within the species, *Bacillus stearothermophilus*, according to the classification by Bergey. However, it was noted that some of the physiological characteristics of the strains differed somewhat from that of the type culture. For example NML Strain I (as further described below) did not hydrolyze starch and could not be grown on a proteose-peptone acid agar slant, thus differing in this respect from the type culture.

(B) Taxonomical properties of seventeen isolated strains.—Seventeen strains of the isolated colonies were selected for study. These strains are referred to hereafter as NML strains A through Q, respectively. The taxonomical properties were determined, as follows.

TABLE I.—TAXONOMICAL PROPERTIES (I) Morphological Characteristics (All 17 Strains)

(1) Vegetative rods—1.2 to 1.5 by 3.5 to 5.8 microns, sometimes occurring in filaments. Motile (peritrichous flagella). Gram-positive. Encapsulated.
(2) Sporangia—Definitely swollen and racket-shaped.
(3) Spores—1.0 to 1.3 by 1.6 to 2.3 microns, characteristically variable in size, ellipsodial (oval), terminal to subterminal, spore wall thick and stainable.

(II) Culture Characteristics (A) Surface colonies on solid media (grown on nutrient agar medium):
  (1) Shape—Irregular: A, B, D, H, I, J, K, M, N, O and Q. Circular: C, E, F, G, L and P.
  (2) Size—Pinpoint to small (less than 2.5 mm. in diameter): All strains.
  (3) Chromogenesis—Negative: All strains.
  (4) Opacity—Translucent to opaque: All strains.
  (5) Elevation—Raised: A, B, D, H, I, J, K, M, N, O and Q. Convex: F, L and P. Umbonate: C, E and G.
  (6) Surface—Rough and dull: A, B, D, H, J, K, M, N, O and Q. Rough and glistening: I. Smooth and dull: C, E, F, G, L and P.
  (7) Edge—Undulate: A, B, D, H, J, K, M, N, O and Q. Entire: C, E, F, G, L and P. Lobate: I.
  (8) Consistency—Butyrous: All strains.
  (9) Emulsifiability—Easy in water and forms uniformly turbid suspension: All strains.
  (10) Odor—Putrified odor: All strains.
(B) Broth culture (grown on nutrient broth):
  (1) Amount of growth—Moderate: All strains.
  (2) Surface growth—Formation of a ring which disintegrates on shaking: C, E, F, G, J, L and M. Formation of a pellicle which disintegrates on shaking: A, B, D, H, I, K, N, O and Q. Absent: P.
  (3) Turbidity—Uniform: C, D, G, H, I, J, K, M, N, O and Q. Absent: A, B, E, F, L and P.
  (4) Deposit—Flocculent which disintegrates on shaking: A, B, C, E, F, G, I, L, M and O. Granular which disintegrates on shaking: D, H, J, K, P and Q.

(III) Physiological Characteristics

As to physiological characteristics, all of these strains shared certain common characteristics. These included the characteristic of being acid-fast, and all were positive as to catalase; negative to methyl red; negative to Voges-Proskauer; positive as to utilization of citrate; positive as to hydrolysis of gelatin; positive as to hydrolysis of casein; negative as to production of indole; and positive as to production of hydrogen sulfide.

Other physiological characteristics are described in Table II below.

TABLE II.—PHYSIOLOGICAL CHARACTERISTICS

| Biochemical tests | A | B | C | D | E | F | G | H | I | J | K | L | M | N | O | P | Q |
|---|---|---|---|---|---|---|---|---|---|---|---|---|---|---|---|---|---|
| Growth on proteose-peptone | − | − | − | + | − | − | − | + | − | + | − | + | − | + | + | + | + |
| Oxidase | + | + | + | + | ± | + | + | + | + | + | + | + | + | + | + | + | + |
| Hydrolysis of starch | + | + | + | − | + | − | − | + | − | + | − | + | + | − | + | − | − |
| Ammonia from urea | + | + | + | − | + | − | − | + | − | + | − | − | + | + | − | − | − |
| Production of nitrate: | | | | | | | | | | | | | | | | | |
| Medium (1) | − | − | − | − | + | + | + | + | − | + | − | + | + | − | + | − | − |
| Medium (2) | + | + | ± | ± | − | − | + | + | + | + | ± | − | + | + | + | ± | − |
| NaCl broth: | | | | | | | | | | | | | | | | | |
| 2% | + | + | + | − | + | + | + | + | + | + | + | + | + | + | + | + | + |
| 3% | ± | − | − | − | − | − | − | − | − | − | − | − | ± | ± | − | − | − |
| 5% | − | − | − | − | − | − | − | − | − | − | − | − | − | − | − | − | − |
| Temp. for growth: | | | | | | | | | | | | | | | | | |
| 37° C | + | + | + | + | + | ± | + | − | ± | + | + | − | + | − | − | + | ± |
| 43° C | + | + | + | + | + | + | + | + | + | + | + | + | + | + | + | + | + |
| 65° C | + | + | + | + | + | + | + | + | + | + | + | + | + | + | + | + | + |
| Optimum | | | | | | | | | 55–60° C. | | | | | | | | |

NOTE.—Medium (1)=Nitrate broth; Medium (2)=Succinate-nitrate broth.

SPECIFIC EXAMPLES

To describe the invention further, several demonstrations of the invention will be described in detail. In the following examples and elsewhere throughout the specification, all parts and percentages are by weight unless expressly stated to be otherwise.

Example I.—Production of Glucose Isomerase Enzyme Preparation

A culture medium was prepared from the following ingredients:

TABLE III.—CULTURE MEDIUM

| Ingredient: | Percentage |
|---|---|
| Xylose | 0.5 |
| Starch | 0.5 |
| Peptone | 0.5 |
| Corn steep liquor (55% solids) | 1.0 |
| Meat extracted | 0.5 |
| Yeast extracted | 0.25 |
| Sodium chloride | 0.5 |
| Magnesium sulfate hydrate | 0.05 |
| Cobalt chloride hydrate | 0.0024 |

The pH of the culture medium was adjusted to 7.0. After sterilization at 110° C. for ten minutes, the culture medium was divided into six aliquots of 50 ml. each. Each aliquot was then inoculated, respectively, with one strain of the B. stearothermophilus microorganism. The following six strains were utilized: C; E; H; I; L and M.

The several strains were then incubated for six hours at 55° C. on a reciprocating shaker operated at 130 strokes per minute to aerate the cultures. The cells were then harvested by centrifuging each culture medium. Each batch of harvested cells was then washed twice with a 0.85% saline solution.

Each batch of washed cells was then suspended in 8 ml. of 0.05 M tris HCl buffer at a pH of 7.5. To this suspension, 2 ml. 0.25% lysozyme solution and 0.1 ml. of toluene were added. Each cell suspension was then autolysed for 13 hours at 45° C., then centrifuged again. The supernatant fluid was used as a glucose isomerase enzyme preparation.

Isomerizations were then carried out with the six glucose isomerase enzyme preparations thus obtained.

Each isomerization was carried out utilizing a standard assay mixture. The assay mixture contained, per ml., the following components:

TABLE IV.—ASSAY MIXTURES

| Component: | Micromoles |
|---|---|
| Glucose | 100 |
| Magnesium sulfate | 10 |
| Cobalt chloride hydrate | 1 |
| Tris HCl buffer at pH 7.5 | 50 |

In addition, the assay mixture contained, per ml., approximately 500 units of enzyme activity.

Each assay mixture was incubated for 10 minutes at 60° C. After that period of incubation, 1 ml. of the reaction mixture was withdrawn into 4 ml. of 0.5 N perchloric acid solution. The amount of fructose formed was determined by the cystein-carbazol method as described in J. Biol Chem., 192, 583 (1951). The intensity of the color developed at 60° C. for 10 minutes was read at 560 mu. One unit of enzyme activity was defined as the amount of enzyme producing 1.0 mu mole of fructose equivalent per minute under the conditions just described.

The results that were observed with the several different enzyme preparations, obtained from the six strains of the microorganism, are reported below in Table V.

TABLE V

| NML strain: | Enzyme activity (units/ml. culture) |
|---|---|
| C | 44 |
| E | 46 |
| H | 42 |
| I | 139 |
| L | 54 |
| M | 83 |

Example II.—Evaluation of the Properties of a Glucose Isomerase Enzyme Preparation of B. stearothermophilus NML Strain I A more detailed study was made with respect to B. stearothermophilus NML Strain I. The strain was grown as described above, an enzyme preparation was made by lysis as described above, and the enzyme activity was determined after different periods of incubation time in the culture medium, as reported below in Table VI.

TABLE VI

Activity of an enzyme preparation from B. stearothermophilus NML Strain I

| Culturing time (hours): | Cell growth (optical density at 660 mu) | Enzyme activity (units/ml. culture) |
|---|---|---|
| 0 | 0.38 | |
| 2 | 1.3 | |
| 3 | 2.2 | 31 |
| 5 | 3.3 | 42 |
| 6 | 3.6 | 79 |
| 7 | 3.9 | 72 |

The glucose isomerase enzyme preparation from NML Strain I was also evaluated for thermal stability and proved to be quite remarkable. After heat treatment of the enzyme preparation at 80° C. for 30 minutes, the enzyme preparation showed no substantial decrease in activity.

The thermal stability of the sonic extract of the cells of NML Strain I was also evaluated. Several different aliquots of the sonic extract were then heated at pH 7.5 (0.05 M Tris HCl buffer) for 30 minutes each at several different temperatures, as reported below in Table VII. At the end of the heating period, the residual activity of the enzyme preparation was determined, following the assay method described in Example I, with the results reported in Table VII below.

TABLE VII.—THERMAL STABILITY OF SONICATE OF NML STRAIN I CELLS

| Temperature (° C.): | Residual activity (percentage ratio) |
|---|---|
| 40 | 100 |
| 50 | 105 |
| 60 | 128 |
| 70 | 119 |
| 80 | 120 |
| 90 | 30 |

Several additional aliquots of the crude sonic extract of cells of the NML Strain I microorganism were subjected to assay for their respective levels of activity at different temperatures. To make the assay, the isomerization reaction technique described in Example I was followed, but at the several different temperatures specified in Table VIII below, as follows:

TABLE VIII.—ENZYMATIC ACTIVITY AT SEVERAL DIFFERENT TEMPERATURES OF THE SONICATE OF NML STRAIN I CELLS

| Temperature (° C.): | Enzyme activity (Ratio) |
|---|---|
| 45 | 2 |
| 50 | 2 |
| 55 | 5 |
| 60 | 11 |
| 65 | 19 |
| 70 | 25 |
| 75 | 62 |
| 80 | 64 |
| 85 | 100 |
| 90 | 90 |

As the data in Tables VII and VIII indicate, the optimum isomerization temperature for this crude enzyme extract was 85° C., when the isomerization time was 10 minutes.

The foregoing data demonstrate the advantageous properties of enzyme preparations derived from our thermophilic microorganisms. The characteristic thermal stability of these enzyme preparations permits their use at higher isomerization temperatures, which in turn leads to shorter isomerization times. In turn, this has the result, through the effective and rapid isomerization that takes place, of making possible the use of a smaller amount of enzyme in terms of total units of activity employed, for a given degree of isomerization. Another important advantage is that the high temperature that can be employed during the isomerization process keeps bacterial contamination to a minimum and, in addition, inhibits or prevents the activities of other enzymes that are productive of side reactions and that are therefore deleterious.

Example III.—Enzyme Production of
B. stearothermophilus NML Strain I

The enzyme production of B. stearothermophilus NML Strain I was studied by a time lapse technique, using a 20 liter jar fermentor.

The jar fermentor was operated at 50° C. with agitation at 150 r.p.m. and aeration at 20 liters per minute. The culture medium was of the same composition as the culture medium described in Example I. The enzyme activity was evaluated by the assay method described in Example I. The results are tabulated below in Table IX.

TABLE IX

Enzymatic activity of enzyme preparations obtained from B. stearothermophilus at different cultures times

| Culturing time (hours): | Growth (optical density at 660 mμ) | Enzyme activity (units/ml. culture) |
|---|---|---|
| 0 | 0.24 | 0 |
| 5 | 1.3 | 28 |
| 10 | 2.2 | 90 |
| 14 | 2.8 | 120 |
| 16 | 2.9 | 144 |
| 20 | 3.0 | 50 |

As the data demonstrates, the culture of this strain of the microorganism should be stopped after about 16 hours, to permit harvesting of the cells and recovery of an enzyme preparation having a high level of activity.

To demonstrate the isomerization activity of the enzyme preparation obtained after 16 hours of culture time, a mixture was made up containing the following concentration of components:

TABLE X.—ASSAY MIXTURE FOR WHOLE CELL ENZYME PREPARATION

| Component | Concentration |
|---|---|
| Glucose | 50 g./100 ml. |
| Tris HCl buffer, pH 7.5 | 0.05 M. |
| Magnesium sulfate hydrate | 0.01 M. |
| Cobalt chloride hydrate | 0.001 M. |

The live whole cells of B. stearothermophilus NML Strain I, obtained from 20 ml. of the culture obtained after 16 hours above, were incorporated in the assay mixture described above. The concentrations listed are final concentrations. The entire mixture was then incubated at 75° C. for 24 hours.

Following incubation, the isomerizate was assayed for fructose, using the assay technique described in Example I. It was found that 50% of the glucose present had been converted to fructose.

To demonstrate isomerization efficacy further, the isomerization just described was repeated with a smaller enzyme dosage but longer incubation time. The reaction mixture was prepared with the live whole cells obtained from 12 ml. of the 16 hour culture, and the reaction mixture was incubated at 70° C. for 3 days. Upon assay, it was again found that 50% of the glucose present had been converted to fructose.

General

According to Camron and Esty, *Aerobic Spore Forming Bacteria*, U.S. Department of Agriculture, p. 34, 1952, bacterial cultures that grow at 55° C., but not at 37° C., are classified as obligate thermophiles, while those growing at both 55° C. and 37° C. are classified as facultative thermophiles. These classifications are not generally applicable to the bacterial strains that are considered to be within the scope of the present invention, since some of the strains described above would be classified as obligate thermophiles and other strains would be classified as facultative thermophiles.

All of the strains of thermophilic bacteria that have been screened can be identified as falling within the classification of B. stearothermophilus, although some of the individual strains differ from the type culture because of their inability to hydrolyze starch. We believe that previous descriptions of the type culture as including only strains that can hydroyze starch are sufficiently broad, and the term B. stearothermophilus is used in this application to refer to the type culture as previously identified in the art, but including strains that do not have the ability to hydrolyze starch. This is in conformity with the reports of Epstein and Grossowicz, J. Bacteriology, 99, 414 (1969), and Daron, J. Bacteriology, 93, 703 (1967). Our usage is also in general conformity with Walker and Wolf, *Identification Methods for the Microbiologist*, Gibbs and Skinner, Vol. 2, Academic Press, p. 106, 1966. In using the term, *B. stearothermophilus*, are intended to encompass natural and artificial variants thereof that have the functional characteristics required for the present invention.

We have made detailed studies of the 17 strains that are identified above as NML Strains A through Q inclusive. We would subdivide these strains into classifications on the basis of two physiological characteristics, namely, the ability to hydrolyze starch and growth on proteose-peptone acid agar. We would subdivide these 17 strains into 4 distinct groups as follows:

(I) Hydrolysis of starch:
    (A) Growth on proteose-peptone acid agar: H, J, N and O.
    (B) No growth on proteose-peptone acid agar: A, B, E and K.

(II) No hydrolysis of starch:
    (A) Growth on proteose-peptone acid agar: D, L, P and Q.
    (B) No growth on proteose-peptone acid agar: C, F, G, I and M.

As to morphological characteristics, these strains can also be separated into two distinct groups. One group would include those bacteria that have the form of curved rods, which would include strains G, L, and P. The other strains have the form of straight rods. However, up to the present time, no relationships have been observed between these somewhat arbitrary classifications and the enzyme activities of the several strains.

The glucose isomerase enzyme preparations of the present invention could properly be referred to as xylose isomerases. The reason is that xylose is the natural substrate of the isomerase, which characteristically exhibits a lower Michaelis constant when it acts on xylose than when it acts on glucose. Slight activity is observed with respect to arabinose and ribose, but there appears to be no activity with respect to mannose, galactose, sorbose, glucose 6-phosphate, sedoheptulose, maltose, gentibiose and melibiose.

The glucose isomerase enzyme preparations of the present invention are notable because of their thermal stability. They have been found to be stable at 75° C. for 60 minutes. The enzyme preparations retain some activity even at temperatures as high as 90° C. The enzyme preparations are unusually thermally stable, highly active, and effective for speedy isomerization whether used in the form of live whole cells, freeze dried cells, cell extracts such as sonic extracts, or in some other purified form. Their optimum pH is in the range 7.2–7.8. They are generally stable in alkaline solutions and are inactivated at about pH 5.0 or lower.

The superior thermal stability of the enzyme preparations of the present invention permits high temperature isomerization on a practical scale, with all of the attendant advantages of limited enzymatically catalyzed side reactions and limited contamination. Moreover, the high temperatures that can be employed tend to accelerate the isomerization rate.

In addition, the thermophilic bacilli of the present invention permit the use of high temperature culturing conditions, which lead to several advantages. Although culturing conditions do tend to differ somewhat between the several strains, generally the optimum culture temperature is about 65° C. when the nutrient broth is used. This permits rapid culturing and limits the chance for contamination and the attendant production of undesirable enzymes.

While only a few strains have been referred to and described above in terms of morphology, taxonomy, and enzyme production, all of the strains of *Bacillus stearothermophilus* that we have evaluated, and there have been many more than those referred to above, do produce glucose isomerase when cultured in a medium containing xylose or a xylose or xylose-supplying material. For example, it is quite feasible to employ xylan hydrolyzate in place of or in addition to xylose in the culture medium.

Generally speaking, the optimum temperature for isomerization, utilizing glucose isomerase enzyme preparations produced in accordance with the present invention, is in the range from about 75° C. to about 90° C. This is substantially higher than the optimum temperature range for most of the other glucose isomerase enzyme preparations that have been evaluated to date.

The composition of the culture medium that is specifically described above is one preferred composition only. Many other suitable culture media compositions can be employed. The metal requirement for *B. stearothermophilus* appears to be for cobalt, although at present this is equivocal, and, in some cases, for magnesium. Other suitable culture medium compositions, by way of illustration, are reported below in Table XI.

TABLE XI.—MEDIUM COMPOSITION

| | Percent | | | |
|---|---|---|---|---|
| | 1 | 2 | 3 | 4 |
| Xylose | 0.5 | 0.6 | 0.6 | 0.6 |
| Glucose | | 0.4 | 0.4 | 0.2 |
| Starch | 0.5 | | | |
| Corn syrup liquid, 42 D.E. | 1.0 | 3.0 | 3.0 | 2.0 |
| $(NH_4)_2SO_4$ | | 1.0 | 1.0 | 0.5 |
| $MgSO_4.7H_2O$ | 0.05 | 0.01 | | |
| $CoCl_2.6H_2O$ | 0.0024 | 0.0024 | 0.0024 | 0.0012 |
| $FeCl_3.6H_2O$ | | | 0.001 | |
| $CaCl_2.2H_2O$ | | | 0.01 | |
| $KH_2PO_4$ | | | 0.1 | |
| $K_2HPO_4$ | | | 0.1 | |
| NaCl | 0.5 | | | |
| Peptone | 0.5 | | | |
| Meat extract | 0.5 | | | |
| Yeast extract | 0.25 | | | |
| Glycine | | | | 0.3 |
| Glutamic acid | | | | 0.6 |

After about 6 hours of growth of NML Strain I in each of these culture media, the best growth was observed in medium 1 of Table XI. However, after 8 to 12 hours of culture time, slightly superior results were obtained with medium 3 while growth in medium 1 dropped off so that it was slightly inferior to media 2 and 3. On the other hand, as measured in terms of enzyme activity, measured in terms of units per ml. of culture broth, medium 3 produced substantially better results than either the other two culture media, with the poorest performance being obtained wih medium 1.

Very high enzyme activity was obtained by culture of NML Strain I in a jar fermentor using medium 4 of Table XI as the culture medium. An example of the results is shown below.

TABLE XII.—CELL GROWTH AND ENZYME PRODUCTION IN CULTURE MEDIUM 4 OF TABLE XI

| | Growth (Optical density at 660 mu) | Enzyme activity (units/ml. culture medium) |
|---|---|---|
| Culturing time (hours): | | |
| 0 | 0.7 | 0 |
| 7 | 2.5 | 106 |
| 9 | 3.1 | 222 |
| 10.5 | 3.7 | 296 |
| 12 | 3.7 | 280 |
| 14 | 3.9 | 266 |

Studies on the effect of the culture medium appear to indicate that cobalt may not be essential for enzyme production, although it does appear to be effective for stabilization of the enzyme during culturing. The addition of small amounts of glycine to the culture medium increases enzyme production. Although the presence of glycine appears to lead to autolysis under some conditions, it does not appear to cause autolysis when the bacterial cells are growing vigorously.

The optimum growth temperature for NML Strain I appeared to be in the range from 55° C. to 60° C.

Optimum temperature for growth generally fluctuates somewhat, depending on the culturing conditions, especially at higher temperatures. Data in Table II above were obtained by culturing on agar slants of nutrient medium. When a liquid, xylose-starch medium was used, optimum temperature was found to be at 55° C.–60° C. However, when a nutrient broth, containing 0.5% glucose, 1% meat extract, 1% peptone and 0.3% NaCl, at pH 7.2, was used, the optimum growth temperature was found to be at 65° C. The specific growth rate at each temperature was calculated from the growth curves plotted from observed data, as follows:

$k_{65°\,C.} = 1.658$, $k_{60°\,C.} = 1.058$, $k_{55°\,C.} = 0.787$ $k_{50°\,C.} = 0.484$ and $k_{45°\,C.} = 0.053$ It is therefore concluded on the basis of observations to date that the optimum temperature for growth is in the range 55° C.–60° C.

The Michaelis constant of the enzyme preparation, as to glucose, is $$K_m(M) = 0.22;$$

as to fructose the value is:

$$K_m(M) = 0.20.$$

While the enzyme preparation can be employed in the form of whole cells or sonic extracts, it can also be employed in more purified form. A somewhat purified form of enzyme preparation can be made by ammonium sulfate fractionation and chromatography utilizing the materials such as, for example DEAE-Sephadex A–50, Sephadex G–150, carboxymethyl cellulose, and the like. Even further purification is possible by steps such as, for example, dialysis, centrifugation, and crystallization.

While the enzyme preparations of this invention are effective in isomerizing glucose as it occurs in starch hydrolyzates such as, for example, corn syrup, they are, of course, also effective in isomerizing solutions made up from crystalline dextrose or whole sugar (solidified converted starch).

Several of the strains mentioned above have been deposited in public depositories without restriction and are freely accessible to the public. These include the following strains, which are deposited at the Northern Regional Research Laboratory at Peoria, Ill.:

TABLE XIII.—NML STRAINS ON DEPOSIT AT NRRL

| NML strain | Deposit number |
|---|---|
| D | NRRL B–3680 |
| H | NRRL B–3681 |
| M | NRRL B–3682 |

In addition, another suitable strain not referred to previously above, has been deposited without restriction and is freely accessible to the public at the American Type Culture Collection, Rockville, Md.: ATCC 21,365.

One advantage of the fructose-bearing products of the present invention is their characteristically low content, generally below 0.5% of total sugar, of an undesirable sugar, psicose.

CONCLUSION

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A xylose and glucose isomerase enzyme preparation characterized as being thermally stable at temperatures up to about 90° C. and capable of enzymatically isomerizing up to 50% by weight of glucose to fructose with the formation of less than about 0.5% by weight of psicose based upon total sugar, said preparation being further characterized as exhibiting slight activity with respect to arabinose and ribose and substantially no activity with respect to mannose, galactose, sorbose, glucose 6-phosphate, sedoheptulose, maltose, gentibiose and melibiose, said preparation being recovered from a cell-free extract of an induced microorganism prepared by growing a thermophilic microorganism having the characteristics of Bacillus stearothermophilus at a temperature of at least about 55° C. in the presence of an inducing agent selected from the group consisting of xylose and xylose-supplying materials as at least a part of the carbon source for said microorganism.

2. An enzyme preparation as defined in accordance with claim 1, wherein the preparation comprises a cell-free extract of the microorganism.

3. An enzyme preparation as defined in accordance with claim 1, wherein the preparation comprises a substantially pure isolate of the microorganism.

4. An enzyme preparation as defined in claim 1, wherein said microorganism is a strain selected from the group consisting of B. stearothermophilus ATCC 21,365, NRRL B–3680, NRRL B–3681 and NRRL B–3682.

5. A process for preparing a glucose isomerizing enzyme preparation which comprises growing a thermophilic microorganism belonging to the species Bacillus stearothermophilus in the presence of an inducing agent selected from the group consisting of xylose and xylose-supplying materials as part of the carbon source for said microorganism, maintaining the induced microorganism at a temperature of at least about 55° C. for a period of time suitable for the production of said preparation by said microorganism and recovering said enzyme preparation.

6. A process for preparing an enzyme preparation as defined in claim 5, wherein live whole cells containing said glucose isomerase enzyme preparation are recovered.

7. A process for preparing an enzyme preparation as defined in claim 5, wherein said enzyme preparation is recovered in the form of a cell-free extract.

8. A process for preparing an enzyme preparation as defined in claim 5, wherein said enzyme preparation is recovered in substantially purified form.

9. A process for preparing an enzyme preparation as defined in claim 8, wherein said substantially purified enzyme preparation is obtained by subjecting the incubated microorganism containing the enzyme to ammonium sulfate fractionation and chromatography utilizing a material selected from the group consisting of DEAE-Sephadex and carboxymethyl cellulose.

10. A process for preparing an enzyme preparation as defined in claim 5, wherein said microorganism is a strain selected from the group consisting of B. stearothermophilus ATCC 21,365, NRRL B–3680, NRRL B–3681 and NRRL B–3682.

11. A process for enzymatically converting glucose to fructose which comprises subjecting a glucose-containing solution to the enzymatic action of a glucose-isomerizing enzyme derived from a microorganism belonging to the species Bacillus stearothermophilus that has been grown in the presence of an inducing agent selected from the group consisting of xylose and xylose-supplying materials as at least part of the carbon source for said microorganism at a temperature of at least about 55° C., and recovering a fructose-containing liquor containing less than about 0.5% by weight psicose based upon total sugar.

12. A process for enzymatically converting glucose to fructose as defined in claim 11, wherein said glucose isomerizing enzyme is in the form of whole cells.

13. A process for enzymatically converting glucose to fructose as defined in claim 11, wherein said glucose isomerizing enzyme is in the form of a cell-free extract.

14. A process for enzymatically converting glucose to fructose as defined in claim 11, wherein said glucose isomerizing enzyme is derived from a microorganism having essentially all the characteristics of *B. stearothermophilus*.

15. A process for enzymatically converting glucose to fructose as defined in claim 11, wherein the microorganism is selected from the group consisting of *B. stearothermophilus* ATCC 21,365 NRRL B–3680, NRRL B–3681 and NRRL B–3682.

16. A process for enzymatically converting glucose to fructose as defined in claim 11, which comprises subjecting the glucose solution to the action of the enzyme preparation at a glucose concentration of 0.5–5 molar for from 1–72 hours and at a temperature of 70° C. to about 90° C.

References Cited

UNITED STATES PATENTS

| | | | |
|---|---|---|---|
| 3,645,848 | 2/1972 | Lee et al. | 195—66 R |
| 3,694,314 | 9/1972 | Lloyd et al. | 195—31 F |
| 3,708,397 | 1/1973 | Sipos | 195—63 |

OTHER REFERENCES

Takasaki et al.: *Agr. Biol Chem.*, vol. 33, pp. 1527–34, 1969.

Danno et al.: *Agr. Biol. Chem.*, vol. 31, pp. 284–92, 1967.

A. LOUIS MONACELL, Primary Examiner

T. G. WISEMAN, Assistant Examiner

U.S. Cl. X.R.

195—65, 66 R